US009436411B2

(12) United States Patent  (10) Patent No.: US 9,436,411 B2
Arnold et al.  (45) Date of Patent: Sep. 6, 2016

(54) SAN IP VALIDATION TOOL

(71) Applicant: Dell Products, LP, Round Rock, TX (US)

(72) Inventors: Howard Ernest Arnold, Londonderry, NH (US); Matthew Clayton Harris, Derry, NH (US)

(73) Assignee: Dell Products, LP, Round Rock, TX (US)

( * ) Notice: Subject to any disclaimer, the term of this patent is extended or adjusted under 35 U.S.C. 154(b) by 0 days.

(21) Appl. No.: 14/228,608

(22) Filed: Mar. 28, 2014

(65) Prior Publication Data
US 2015/0277804 A1   Oct. 1, 2015

(51) Int. Cl.
*G06F 3/00* (2006.01)
*G06F 3/06* (2006.01)
*H04L 29/08* (2006.01)

(52) U.S. Cl.
CPC ............. *G06F 3/0653* (2013.01); *G06F 3/067* (2013.01); *G06F 3/0617* (2013.01); *H04L 67/1097* (2013.01)

(58) Field of Classification Search
CPC .................................................. H04L 67/1097
USPC ........................................................ 710/74
See application file for complete search history.

(56) References Cited

U.S. PATENT DOCUMENTS

| 5,084,819 | A | 1/1992 | Dewey et al. |
|---|---|---|---|
| 5,917,724 | A | 6/1999 | Brousseau et al. |
| 6,148,335 | A | 11/2000 | Haggard et al. |
| 6,189,084 | B1 | 2/2001 | Kurisu |
| 6,408,406 | B1 | 6/2002 | Parris |
| 6,415,189 | B1 | 7/2002 | Hajji |
| 6,434,714 | B1 | 8/2002 | Lewis et al. |
| 6,467,054 | B1 | 10/2002 | Lenny |
| 6,845,306 | B2 | 1/2005 | Henry et al. |
| 7,136,768 | B1 | 11/2006 | Shah et al. |
| 7,278,057 | B2 | 10/2007 | Betancourt et al. |
| 7,302,617 | B2 | 11/2007 | Wookey |
| 7,490,073 | B1 | 2/2009 | Qureshi et al. |
| 7,539,907 | B1 | 5/2009 | Johnsen et al. |
| 7,603,395 | B1 | 10/2009 | Bingham et al. |
| 7,606,986 | B1 * | 10/2009 | Limaye et al. ............... 711/153 |
| 7,676,445 | B2 | 3/2010 | Fry et al. |

(Continued)

OTHER PUBLICATIONS

Notice of Allowance and Fee(s) Due for U.S. Appl. No. 14/180,742; date mailed, Jun. 7, 2016.

*Primary Examiner* — Titus Wong
(74) *Attorney, Agent, or Firm* — Hamilton, Brook, Smith & Reynolds, P.C.

(57) ABSTRACT

The present invention is directed to a method and corresponding apparatus for verifying connectivity in a storage area network. An embodiment begins by communicating with one or more storage devices, through at least one of one or more host machines connected to one or more network switches. Based on the communication, the method may activate a test procedure at the one or more storage devices. The method may determine, through the test procedure, each state of connectivity from the one or more storage devices to each member computing device of a connectivity set. The connectivity set may include at least one of the following: at least one other storage device, at least one of the one or more network switches, and at least one of the one or more host machines. The method may provide a report to one or more users, the report including each state of connectivity.

20 Claims, 8 Drawing Sheets

(56) References Cited

U.S. PATENT DOCUMENTS

| | | |
|---|---|---|
| 7,765,190 B1 | 7/2010 | Bingham et al. |
| 7,860,015 B1 * | 12/2010 | Panelli et al. ............... 370/241 |
| 7,865,278 B2 | 1/2011 | Underdal et al. |
| 7,877,645 B2 | 1/2011 | Meyer et al. |
| 8,005,709 B2 | 8/2011 | King et al. |
| 8,065,571 B2 * | 11/2011 | Dickens et al. ............. 714/715 |
| 8,073,821 B2 | 12/2011 | Zahavi et al. |
| 8,103,463 B2 | 1/2012 | Kalgren et al. |
| 8,136,124 B2 | 3/2012 | Kosche et al. |
| 8,315,991 B2 | 11/2012 | Mandagere et al. |
| 8,521,546 B2 | 8/2013 | Brown |
| 8,631,115 B2 * | 1/2014 | Sheinfeld et al. ............ 709/224 |
| 8,760,780 B1 | 6/2014 | Brooker |
| 8,812,342 B2 | 8/2014 | Barcelo et al. |
| 8,856,927 B1 | 10/2014 | Beloussov et al. |
| 8,909,990 B2 | 12/2014 | Davis et al. |
| 9,084,937 B2 | 7/2015 | Gadher et al. |
| 9,189,309 B1 | 11/2015 | Ma et al. |
| 9,317,349 B2 | 4/2016 | Jacoby et al. |
| 2002/0087950 A1 | 7/2002 | Brodeur et al. |
| 2003/0112538 A1 | 6/2003 | Smith |
| 2004/0205403 A1 | 10/2004 | Markow et al. |
| 2004/0260967 A1 | 12/2004 | Guha et al. |
| 2005/0265160 A1 | 12/2005 | Sasaki et al. |
| 2006/0047715 A1 | 3/2006 | Parizeau |
| 2006/0053338 A1 | 3/2006 | Cousins et al. |
| 2006/0112135 A1 | 5/2006 | Warshawsky |
| 2007/0136389 A1 | 6/2007 | Bergant et al. |
| 2007/0272751 A1 | 11/2007 | Tsurumi |
| 2008/0059292 A1 | 3/2008 | Myers et al. |
| 2008/0301394 A1 * | 12/2008 | Muppirala et al. ........... 711/170 |
| 2009/0161243 A1 | 6/2009 | Sharma et al. |
| 2009/0259749 A1 | 10/2009 | Barrett et al. |
| 2010/0023867 A1 | 1/2010 | Coldiron et al. |
| 2010/0030586 A1 | 2/2010 | Taylor et al. |
| 2010/0050023 A1 | 2/2010 | Scarpelli et al. |
| 2010/0324945 A1 | 12/2010 | Hessing |
| 2011/0106763 A1 | 5/2011 | Madan et al. |
| 2011/0276836 A1 | 11/2011 | Kahana et al. |
| 2012/0066030 A1 | 3/2012 | Limpert |
| 2012/0136985 A1 | 5/2012 | Popescu et al. |
| 2012/0179936 A1 | 7/2012 | Masser et al. |
| 2013/0091499 A1 | 4/2013 | Soundararajan et al. |
| 2014/0040897 A1 | 2/2014 | Davis et al. |
| 2014/0108855 A1 | 4/2014 | Gopakumar et al. |
| 2014/0244343 A1 | 8/2014 | Wilson et al. |
| 2014/0244362 A1 | 8/2014 | Chaudhury |
| 2014/0278730 A1 | 9/2014 | Muhart et al. |
| 2014/0310714 A1 | 10/2014 | Chan et al. |
| 2014/0358357 A1 | 12/2014 | Jones et al. |
| 2015/0046756 A1 | 2/2015 | Sreekumaran et al. |
| 2015/0052406 A1 | 2/2015 | Garrett et al. |
| 2015/0067153 A1 | 3/2015 | Bhattacharyya et al. |
| 2015/0074055 A1 | 3/2015 | Jacoby et al. |
| 2015/0074452 A1 | 3/2015 | Tsukahara et al. |
| 2015/0074462 A1 | 3/2015 | Jacoby |
| 2015/0074463 A1 | 3/2015 | Jacoby et al. |
| 2015/0074467 A1 | 3/2015 | Jacoby et al. |
| 2015/0074468 A1 | 3/2015 | Jacoby et al. |
| 2015/0135033 A1 | 5/2015 | Ellis et al. |
| 2016/0039291 A1 | 2/2016 | Reese et al. |

* cited by examiner

SAN IP VALIDATION TOOL

BACKGROUND OF THE INVENTION

The increased use of technology and computers has generated a corresponding increase in digital data. This ever-increasing digital data requires a corresponding ever-increasing amount of storage space.

The need for storage space for digital data is fueled through many changes in society. For example, home computer users increased storage of multimedia data, especially video and photographic data, has served to increase the amount of storage space needed. Likewise, in industry, storage area networks (SANs) also require increased storage space. As more and more business is being conducted electronically, there is an ever-increasing demand and need for the storage of this vast amount of business data. Furthermore, there is a demand to digitize the storage of once paper files in an attempt to decrease the overhead cost of this paper generation and storage.

In industry, SANs enable users to manage, expand, and maintain large amounts of storage. Examples of types of data stored on SANs include medical imaging data, MICROSOFT SHAREPOINT data, file-sharing data, video data, audio data, email data, disaster recovery data, and data for databases such as Structured Query Language (SQL), ORACLE, MYSQL and other databases.

SUMMARY OF THE INVENTION

Thus, an efficient and reliable method for verifying connectivity between computing devices (including, but not limited to, servers, switches, and storage devices) in a storage area network is presented. The present invention is directed to a method and corresponding apparatus for verifying connectivity in a storage area network. An embodiment of the method of the present invention begins by communicating with one or more storage devices, through at least one of one or more host machines connected to one or more network switches. Network switches may include, but are not limited to, (internet small computer system interface) iSCSI network switches, management switches, or other types of network switches. Based on the communication, the method may activate a test procedure at the one or more storage devices. The method may determine, through the test procedure, each state of connectivity from the one or more storage devices to each member computing device of a connectivity set. The connectivity set may include at least one of the following: at least one other storage device, at least one of the one or more network switches, and at least one of the one or more host machines. The method may provide a report to one or more users, the report including each state of connectivity.

In an embodiment of the method of the present invention, the connectivity may include at least one of: interconnect, cabling, wiring, interfaces, and ports. In another embodiment of the method of the present invention, the method further comprises automatically activating the test procedure at the one or more storage devices, automatically determining each state of connectivity from the one or more storage devices to each member computing device, and automatically providing the report.

In yet another embodiment of the method of the present invention, the report is provided to at least one of the one or more host machines, and the report includes one or more log files. In another embodiment of the method of the present invention, each state of connectivity is determined, through the test procedure, by the one or more storage devices sending one or more commands to each member computing device of the connectivity set and receiving one or more status messages from each member computing device of the connectivity set.

In an embodiment of the method of the present invention, the test procedure includes one or more ping tests from the one or more storage devices to each member computing device of the connectivity set. In an embodiment of the method of the present invention, at least one of the one or more storage devices is indirectly connected to at least one member computing device of the connectivity set. In another embodiment of the method of the present invention, the connectivity set includes one or more redundant or replicated member computing devices.

In another embodiment of the method of the present invention, the test procedure is activated on at least one active module associated with the one or more storage devices. In another embodiment of the method of the present invention, the method further comprises switching from the at least one active module to at least one passive module associated with the one or more storage devices, wherein the test procedure is activated on the at least one passive module. In yet another embodiment of the method of the present invention, the storage area network includes an Internet Small Computer System Interface (iSCSI) storage area network.

A further embodiment of the present invention is directed to an information handling system (IHS). An embodiment of the IHS may comprise a data module configured to communicate with one or more storage devices, through at least one of one or more host machines connected to one or more network switches. The IHS may further comprise a computing module that may activate, based on the communication, a test procedure at the one or more storage devices. The computing module may determine, through the test procedure, each state of connectivity from the one or more storage devices to each member computing device of a connectivity set. The connectivity set may include: at least one other storage device, at least one of the one or more network switches, and at least one of the one or more host machines. The IHS may further comprise a reporting module that may provide a report to one or more users, the report including each state of connectivity.

In an embodiment of the IHS, the connectivity may include at least one of: interconnect, cabling, wiring, interfaces, and ports. In another embodiment of the IHS, the computing module may automatically activate the test procedure at the one or more storage devices, and the computing module may automatically determine each state of connectivity from the one or more storage devices to each member computing device, and the reporting module may automatically provide the report. In an embodiment of the IHS, the reporting module may provide the report to the at least one of the one or more host machines, and the report may include one or more log files.

In another embodiment of the IHS, the computing module may determine, through the test procedure, each state of connectivity, by the one or more storage devices sending one or more commands to each member computing device of the connectivity set and receiving one or more status messages from each member computing device of the connectivity set. In another embodiment of the IHS, the test procedure may include one or more ping tests from the one or more storage devices to each member computing device of the connectivity set. In another embodiment of the IHS, at least one of the one or more storage devices is indirectly connected to at least one member computing device of the connectivity set, and the connectivity set may include one or more redundant or replicated member computing devices.

In another embodiment of the IHS, the computing module may activate the test procedure on at least one active module associated with the one or more storage devices, and the computing module may switch from the at least one active module to at least one passive module associated with the one or more storage devices, and the test procedure is activated on the at least one passive module (i.e., once the passive module but now the new active module).

An alternative embodiment of the invention is directed to a non-transitory computer readable medium having stored thereon a sequence of instructions which, when loaded and executed by a processor coupled to an apparatus, causes the apparatus to perform the following. The apparatus may communicate with one or more storage devices, through at least one of one or more host machines connected to one or more network switches. Based on the communication, the apparatus may activate, at the one or more storage devices, a test procedure. The apparatus may determine, through the test procedure, each state of connectivity from the one or more storage devices to each member computing device of a connectivity set. The connectivity set may include at least one of the following: at least one other storage device, at least one of the one or more network switches, and at least one of the one or more host machines. The apparatus may provide a report to one or more users, the report including each state of connectivity.

BRIEF DESCRIPTION OF THE DRAWINGS

The foregoing will be apparent from the following more particular description of example embodiments of the invention, as illustrated in the accompanying drawings in which like reference characters refer to the same parts throughout the different views. The drawings are not necessarily to scale, emphasis instead being placed upon illustrating embodiments of the present invention.

DETAILED DESCRIPTION OF THE INVENTION

A description of example embodiments of the invention follows.

There is a need in the industry to test and validate a storage area network (SAN) configuration before putting a storage device (including, but not limited to, a storage array or storage volume) into production. Customers who put their storage arrays into production without proper testing often find performance and stability flaws exist in their designs. This may result in a user losing time and data during a triage and recovery process. Although customers use various tests in their efforts to validate SAN configurations, no unified tool exists that is capable of comprehensively testing the customer's SAN infrastructure.

Therefore, the proposed approach includes a SAN IP validation tool. The SAN IP validation tool includes an intuitive menu driven interface that guides deployment teams through the validation process. The tool may run from a standard computer to communicate with the customer's storage array, and may automatically run various tasks to confirm that the SAN configuration is valid. The proposed approach may run from the host side. An external computer communicates with the customer's storage array (i.e., is connected to the host), and automatically runs various tasks to confirm that the SAN configuration is valid. The tasks include parsing the array configuration and testing ports and interfaces for proper communications and references.

Figure 1:
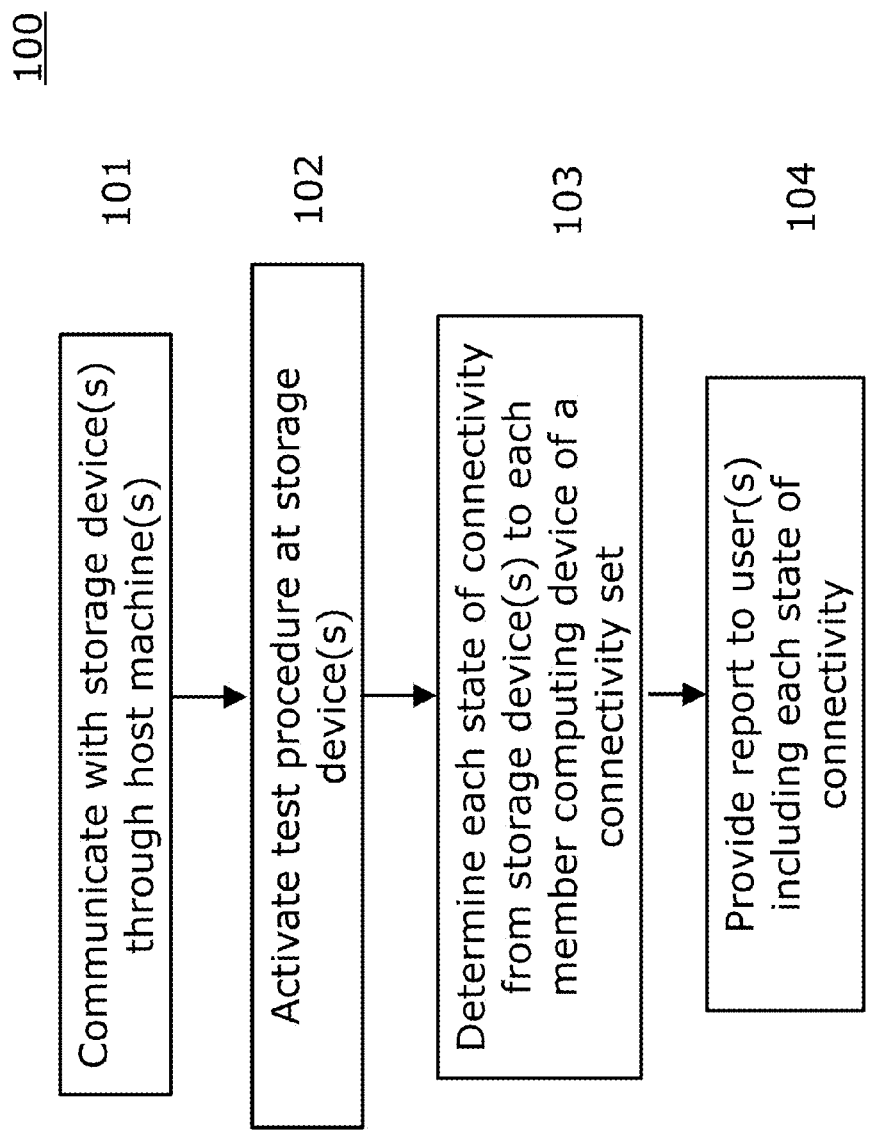
FIG. 1 is a flowchart of a method of verifying connectivity in a storage area network, according to an embodiment of the present invention.

Thus, as illustrated in FIG. 1, an efficient and reliable method 100 for verifying connectivity in a storage area network is presented. The present invention is directed to a method and corresponding apparatus for verifying connectivity in a storage area network. An embodiment of the method of the present invention begins by communicating with one or more storage devices, through at least one of one or more host machines connected to one or more network switches 101. Based on the communication, the method may activate a test procedure at the one or more storage devices 102. The method may determine, through the test procedure, each state of connectivity from the one or more storage devices to each member computing device of a connectivity set 103. The connectivity set may include at least one of the following: at least one other storage device, at least one of the one or more network switches, and at least one of the one or more host machines. The method may provide a report to one or more users, the report including each state of connectivity 104.

Figure 2:
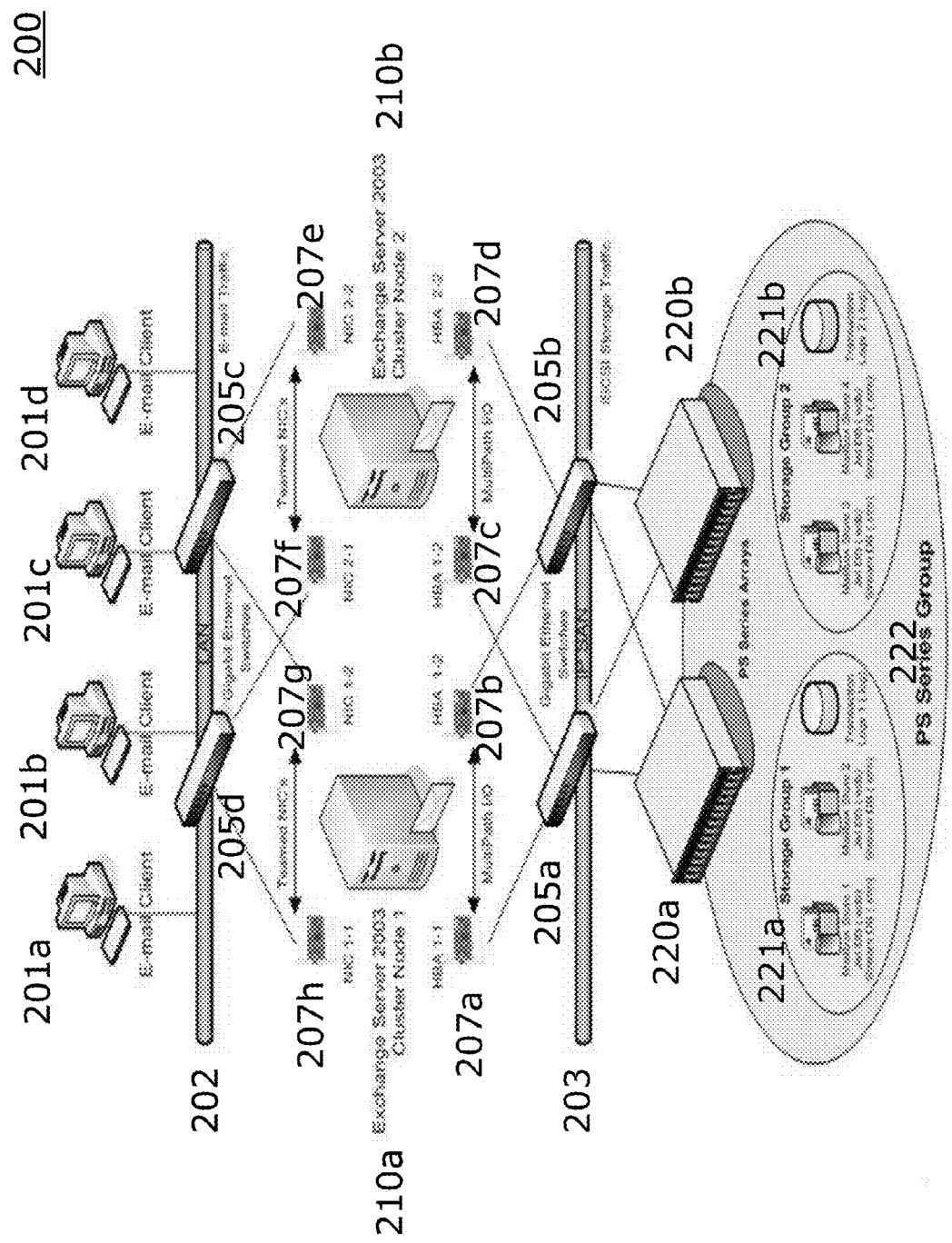
FIG. 2 is a schematic view of a computer network environment in which an embodiment of the present invention may be implemented.

As illustrated in FIG. 2, in one embodiment, the proposed approach may run on a network 200 that may include, but is not limited to, a storage area network (SAN) 203 and a local area network (LAN) 202, a wide area network (WAN), an iSCSI network, or another type of network. The network 200 may be an internet protocol (IP) network, however, it is not so limited. The SAN network 203 may be a SAN internal protocol (SAN IP) network, however, it is not so limited. The LAN 202 may include components such as one or more clients 201a, 201b, 201c, 201d that communicate through one or more network switches 205c, 205d to one or more network interface cards (NICs) 207e, 207f, 207g, 207h to one or more servers 210a, 210b. The SAN 203 may include, but is not limited to, an internet protocol (IP) SAN. The SAN 203 may include components such as one or more servers 210a, 210b that communicate to one or more network switches 205a, 205b through a set of one or more network interface cards (NICs) 207a, 207b, 207c, 207d. Network switches 205a, 205b of the storage area network 203 may communicate to Peer Storage (PS) series arrays 220a, 220b across the SAN 203. Therefore, the SAN 203 may include components such as a PS series group 222 that may include, but is not limited to, storage groups 221a, 221b and PS series data arrays 220a, 220b. In an alternative embodiment, the SAN 203 may be considered to include the LAN 202 and the above-mentioned components with which the LAN 202 communicates, in addition to the above-mentioned components with which the SAN 203 communicates.

Figure 3:
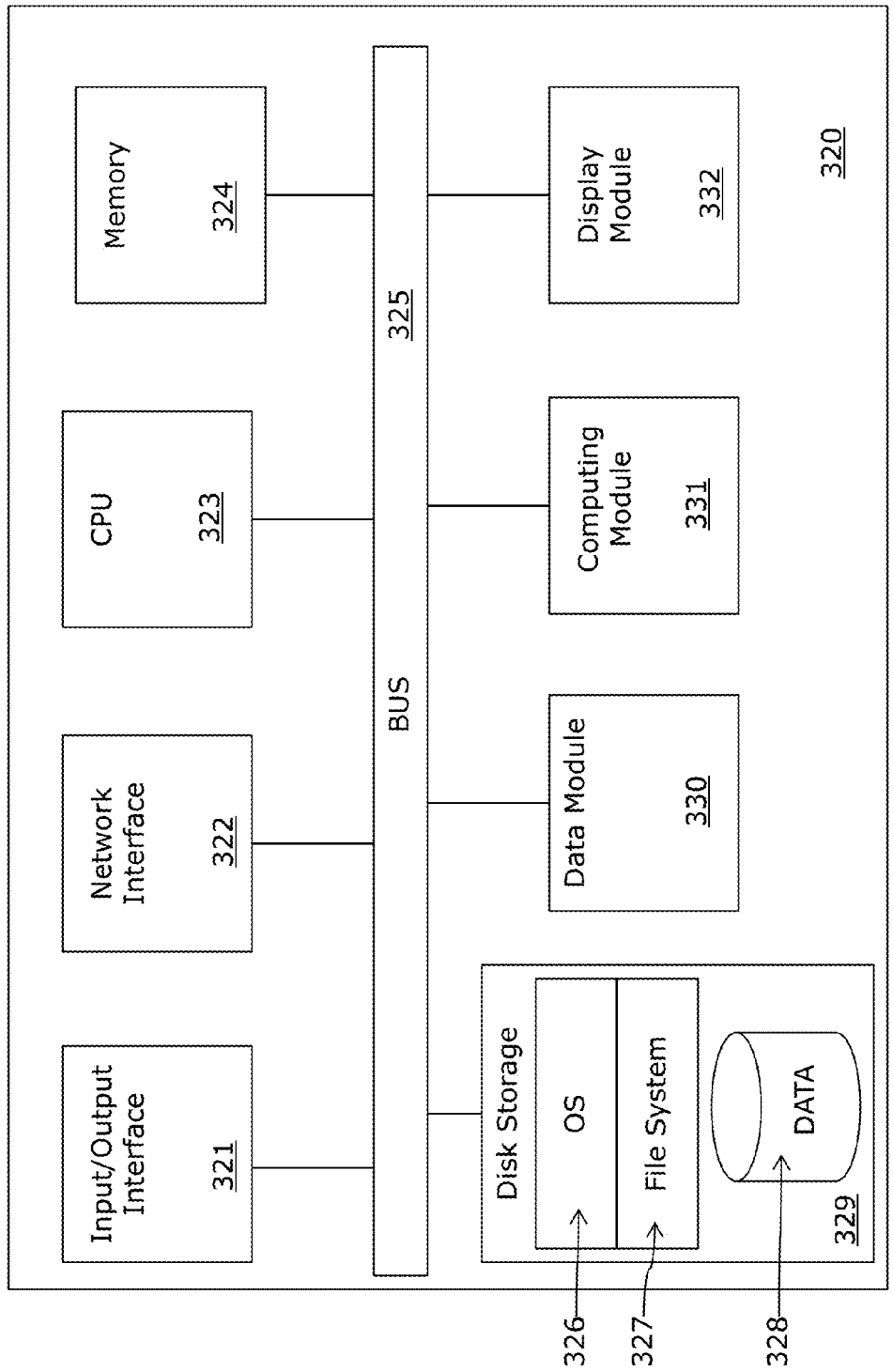
FIG. 3 is a simplified block diagram of an Information Handling System (IHS) in an embodiment of the present invention.

FIG. 3 is a high level block diagram of an information handling system (IHS) 320 that is configured to verify connectivity in a storage area network according to the present invention. The IHS 320 comprises a bus 325. The bus 325 is a connection between the various components of the IHS 320. Connected to the bus 325 is an input/output interface 321 for connecting various input and output devices, such as a keyboard, mouse, display, speakers, etc. to the IHS 320. Further connected to the bus 325 is a network interface 322 for connecting the IHS 320 to the various networks that are known in the art. A Central Processing Unit (CPU) 323 is connected to the bus 325 and provides for the execution of computer instructions. Memory 324 provides volatile storage for data used for carrying out computer instructions. Disk storage 329 provides non-volatile storage for software instructions such as the operating system (OS) 326 and the data 328. Coupled with the OS 326, is the file system 327. Disk storage 329 may be any storage device known in the art.

An embodiment of the IHS 320 may comprise a data module 330 configured to communicate with one or more storage devices, through at least one of one or more host machines connected to one or more network switches. The IHS may further comprise a computing module 331 that may activate, based on the communication, a test procedure at the one or more storage devices. The computing module 331 may determine, through the test procedure, each state of connectivity from the one or more storage devices to each member computing device of a connectivity set. The connectivity set may include: at least one other storage device, at least one of the one or more network switches, and at least one of the one or more host machines. The IHS may further comprise a reporting module 332 (and/or display module) that may provide a report to one or more users, the report including each state of connectivity.

The data module 330 may be communicatively coupled with the computing module 331. The data module 330 may store and/or retrieve data as needed by other elements, including, but not limited to, the computing module 331. The data may be any data described herein. The data module 330 may obtain data by running one or more connectivity tests on at least one member computing device of the storage area network. The data module 330 may retrieve the data from any communicatively coupled source. For example, the data module 330 may retrieve data from the storage device 329 or via the input/output interface 321 or network interface 322.

While the various components of the IHS 320 are illustrated in FIG. 3, embodiments of the IHS 320 are not so limited, and as is known in the art, components and modules of the IHS 320 may be connected in a variety of ways, including embodiments wherein one or more components are remotely located. It should be understood by a person of ordinary skill in the art that the IHS 320 may be implemented in various forms. The respective components and modules of the IHS 320 may be combined in any manner that is known in the art and may be implemented in any combination of hardware and software. For example, the above-described components and modules may be executable instructions in memory 324 or OS 326 operated on by CPU 323. Further, the IHS 320 and its various components and modules may be configured to operate in a manner corresponding to the above described method 100, described herein above in relation to FIG. 1 and its various embodiments.

Figure 4:
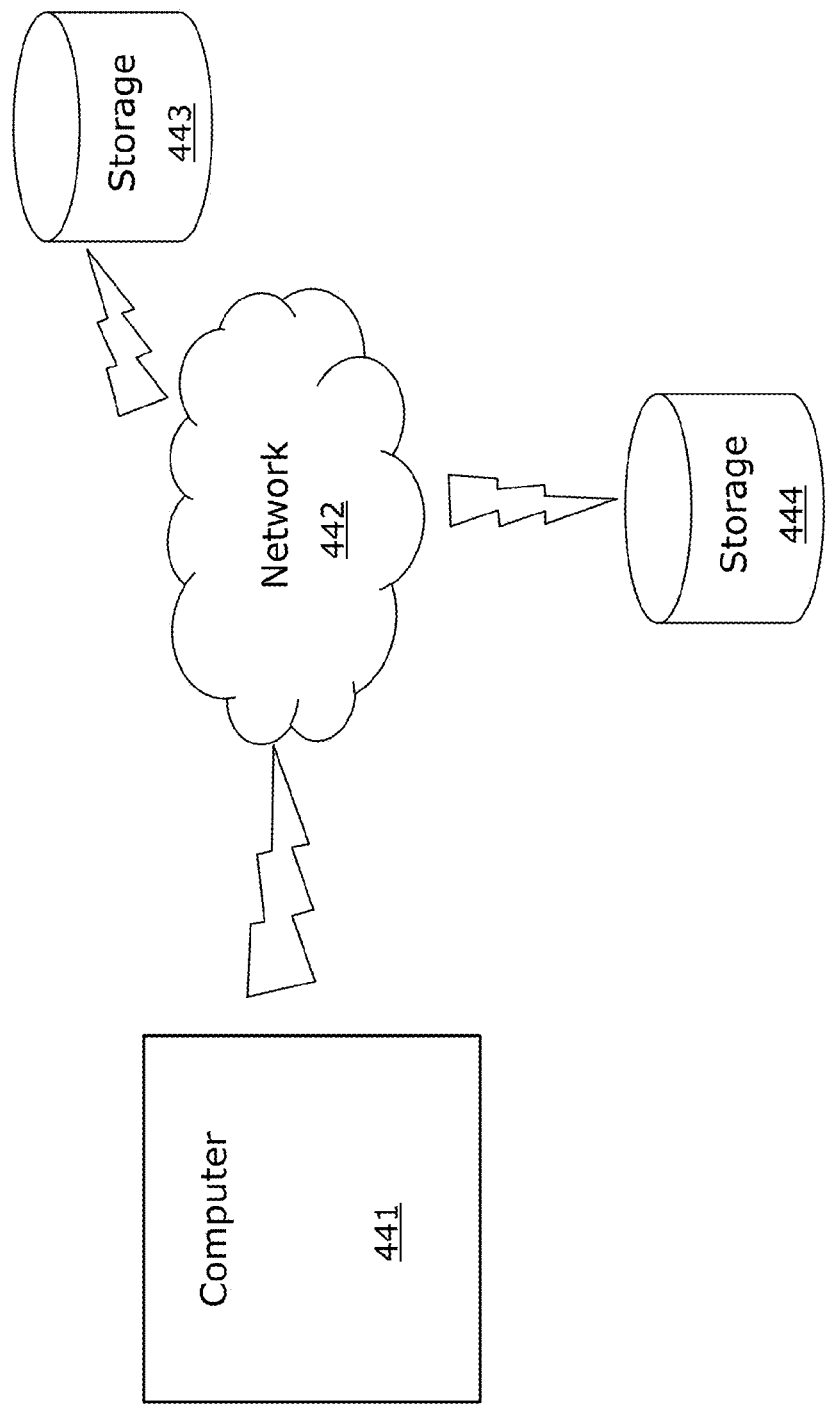
FIG. 4 is a block diagram of another computer network environment in which an embodiment of the present invention may be implemented.

FIG. 4 illustrates another computer network environment 440 in which the present invention may be implemented. The computer 441 and the storage devices 443 and 444 are linked through network 442. The computer 441 and the storage devices 443 and 444 may be connected through any network as is known in the art, including a storage area network (SAN), a wide area network (WAN) or local area network (LAN). The computer 441 may embody the IHS 320 and/or any embodiment of the IHS described herein. Similarly, the computer 441 may be configured to carry out any method or embodiment thereof described herein. According to an embodiment of the invention, the computer 441 is configured to verify connectivity of the network 442 and the storage devices 443 and 444. While only two storage devices 443 and 444 are depicted, the computer network environment 440 may comprise any number of storage devices.

In one embodiment, the present invention includes a computer-implemented test procedure and/or test program that includes a script and suite of tools (implemented through Perl or another computer programming language) that may be run at time of installation that may verify and demonstrate that computing devices (storage devices, storage arrays, storage volumes, network switches, host machines, or other computing devices) are installed and configured correctly according to best practices. The script may also create a report of the current computing device configuration, illustrating information related to each computing device, including, but not limited to, connectivity status information, computing information, port status information, bandwidth information, or configuration information.

The computer-implemented test procedure (including a test script) may include one or more tests for computing devices as follows. The script may test that inter computing device Ethernet connections are configured and are working. The script may test interfaces from a local Group to a Remote Group. For single member groups, the script may test the connectivity between a host and the storage device and/or network switch. The script may test the connectivity from a host to array members Ethernet ports: optionally, this test may require that a volume is created with an access control list (ACL) to it. The script may test passive control by failing over to it and having it take over as the active controller. The script may test whether timeout values on hosts are set to withstand a controller failover: optionally, this test may require that a host have a program like IOMETER running during control module (CM) failover tests.

Figure 5:
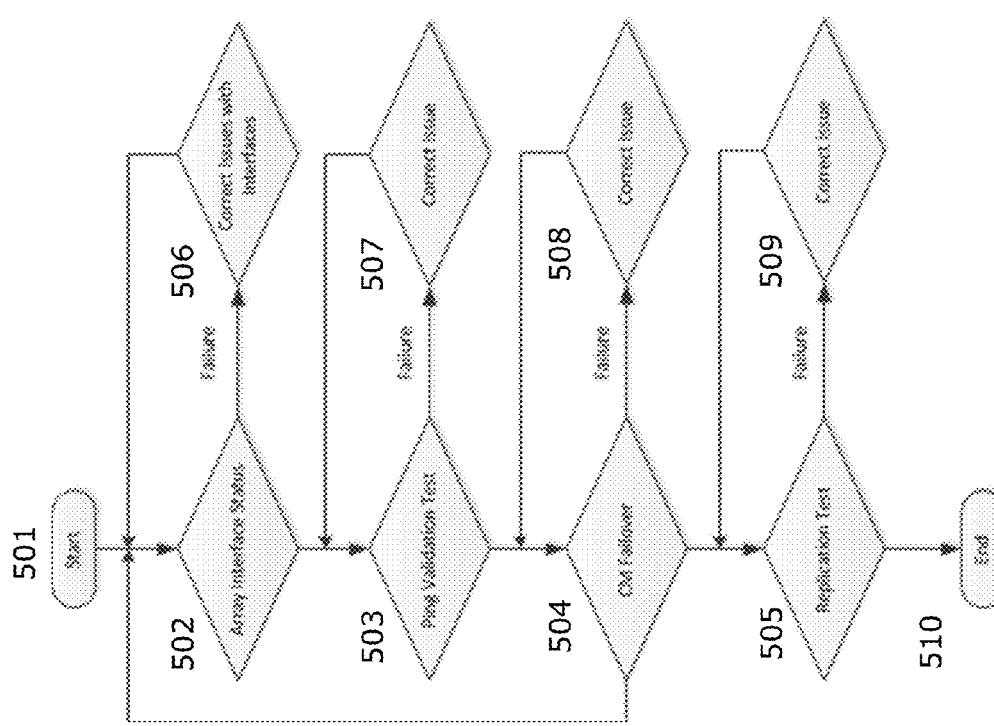
FIG. 5 is a flowchart of a test procedure sequence of an embodiment of the present invention.

FIG. 5 illustrates operation of different testing stages (tests) within the test script. In the method 100 of the present invention, communication with one or more storage devices is established, through one or more host machines connected to one or more network switches. Then, as illustrated in FIG. 5, testing is initiated 501 and one or more testing stages (also known as tests, test procedures, or test modules) are activated, including, but not limited to, an array interface status test 502, a ping validation test 503, a control module (CM) failover test 504, and a replication test 505. Each of the test procedures 502, 503, 504, 505 may determine the state of connectivity from the one or more storage devices to at least one of: one or more storage device, one or more network switches, and one or more host machines (hosts). Although an order of tests is illustrated in FIG. 5, the order of tests 502, 503, 504, 505 is not limited, and different tests may be run in different orders, in parallel, or separately.

In one embodiment, illustrated in FIG. 5, the first test procedure is the array interface status test 502. If the array interface status test 502 detects a failure, then the one or more users corrects one or more corresponding issues 506 and re-invokes the array interface status test 502. If the array interface status test 502 passes, then the ping validation test 503 runs.

If the ping validation test 503 detects a failure, then the one or more users corrects one or more corresponding issues 507 and re-invokes the ping validation test 503. If the ping validation test 503 passes, then the CM failover test 504 runs. The CM failover test 504 induces a failover from the current CM to another CM. For example, the CM failover test may induce a failover from an active CM to a passive CM, or vice versa. If this failover results in a failure, including, but not limited to, a timeout of N seconds (where N may be 1, 6, 60, or another integer or real number value), then the issue is corrected 508 and the CM failover test is rerun 504. After switching its CM successfully, for example, from active to passive, the CM failover test 504 then optionally re-invokes prior tests to test its current CM, such as, but not limited to, the array interface status test 502 and the ping validation test 503. The CM failover test 504 passes when failing over does not result in a failure that needs correction 508 and when the corresponding selected additional tests 502, 503 are rerun and pass. If the CM failover test 504 passes, then the replication test 505 runs. If the replication test 505 detects a failure, then the one or more users corrects one or more corresponding issues 509 and re-invokes the replication test 505. Although not explicitly indicated in FIG. 5, the replication test may be run on either the active or the passive CM, or both. Optionally, upon completion of the replication test 505, the test procedure may exit 510.

Figure 6:
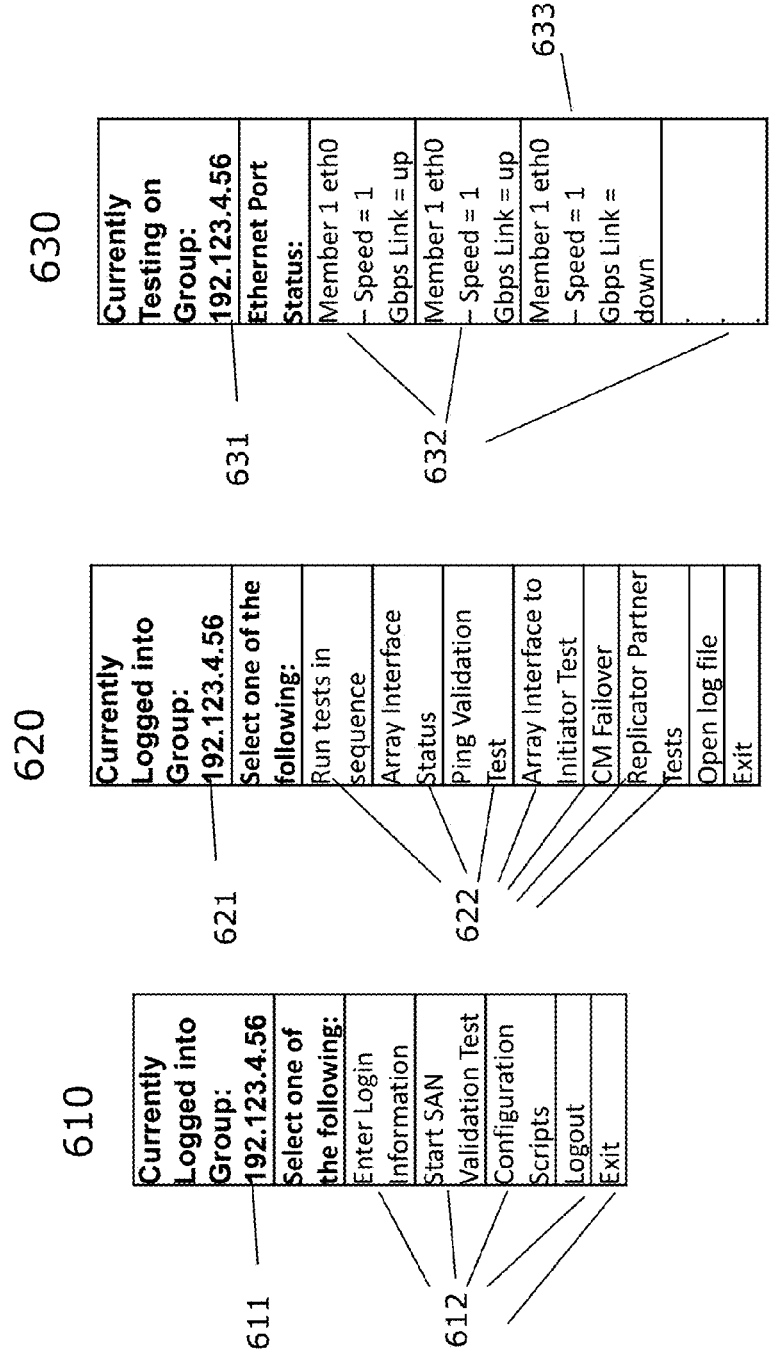
FIG. 6 is a schematic view of a user interface and display of the present invention.

As illustrated in FIG. 6, in one embodiment, the method 100 of the present invention may provide a user interface 600. A user interface control interface 620 is available with user controls 622 to enable the user to select tests individually, select tests in a sequence, open log file results, or exit the test program and/or test procedure. Prior to running one or more tests, optional configuration commands 612 may be accessed through a configuration interface 610, including such configuration commands 612 as entering login information from a given computing device, starting one or more tests, running configuration scripts, logging out of a given computing device, or exiting the program.

As illustrated in an embodiment of a display 600 of FIG. 6, the method 100, or other embodiments of the present invention, may provide a report 630 to one or more users, the report including each state of connectivity for each computing device which is tested by the one or more test procedures. For example, a passing state of connectivity 632 may be indicated by one or more Ethernet links (and/or ports and/or interfaces) being up, and a failing state of connectivity 633 may be indicated by one or more Ethernet links (and/or ports and/or interfaces) being down. Each interface 610, 620, 630 may also employ other display mechanisms, including, but not limited to, displaying group login information 611, 621, 631, respectively.

Figure 7:
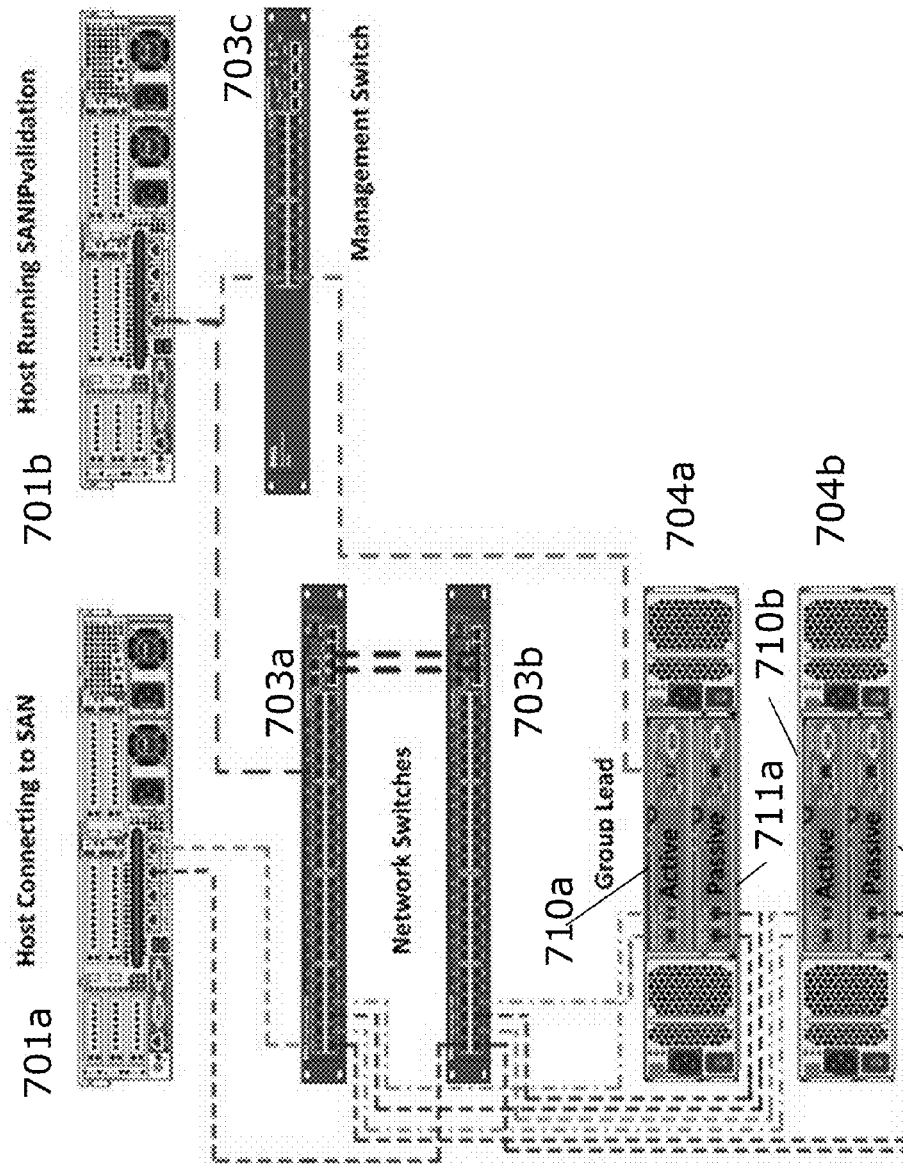
FIG. 7 is a schematic view of yet another computer network environment in which an embodiment of the present invention may be implemented.
Figure 8:
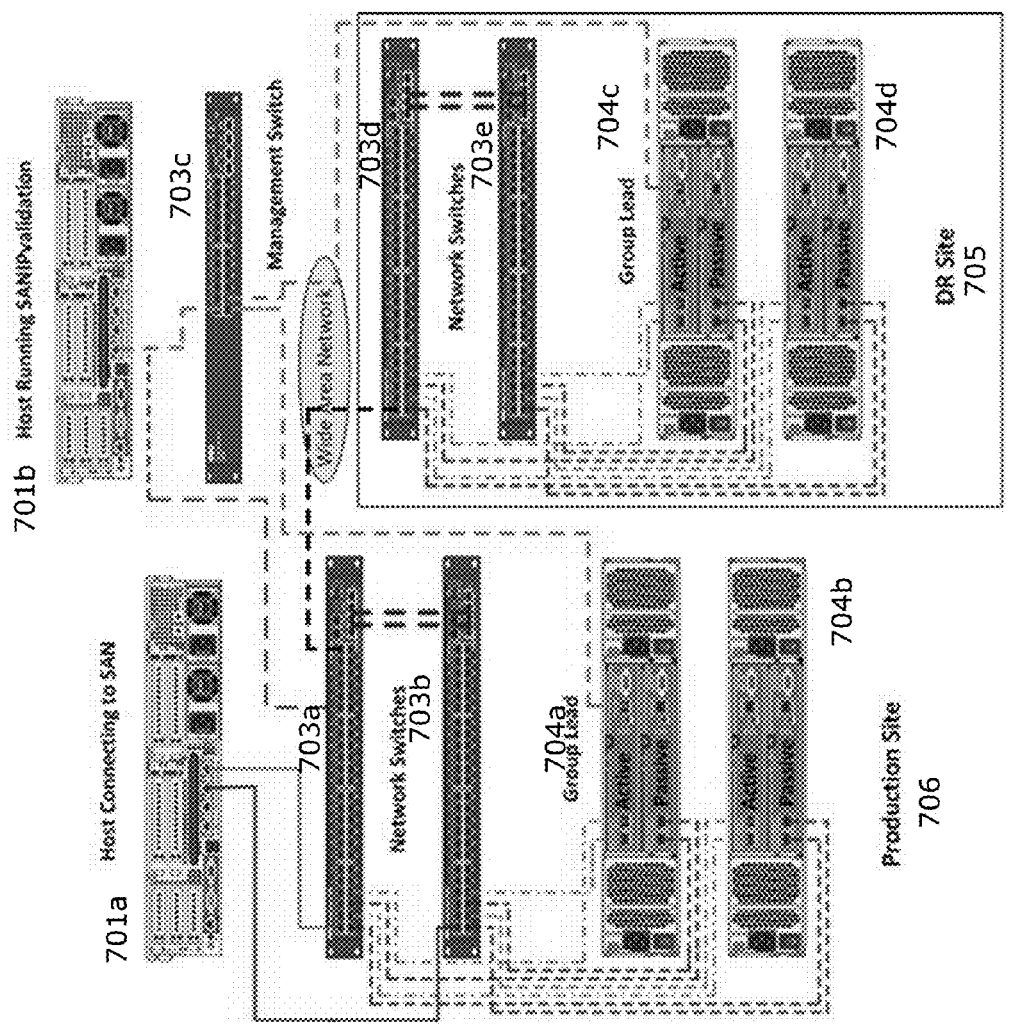
FIG. 8 is a schematic view of a further computer network environment in which an embodiment of the present invention may be implemented for replication testing.

Referring back to FIG. 5, each of the individual tests 502, 503, 504 is explained in more detail to follow in association with FIG. 7, and test 505 is explained in association with FIG. 8. As illustrated in FIG. 7, a network 700 may include hosts 701a, 701b, network switches 703a, 703b, 703c and storage devices 704a, 704b, each storage device having one or more CMs, such as an active CMs 710a, 710b and a passive CMs 711a, 711b.

As illustrated in FIG. 7, a user may login to the group lead storage device 704a, from which tests are then initiated. In an embodiment of the present invention, a validation login (also known as the login procedure, or SAN IP Validation Login) is as follows. The validation login may run from a host 701b that has a connection into the SAN either through the network or through a dedicated management network. As illustrated in FIG. 7, the login path may include a connection from the host 701b to a management network switch 703c, and a connection from the management switch 703c to the group lead storage device 704a. In one embodiment, a group IP address is provided in order to log in to the group lead 704a. Each group (collectively 704a, 704b in the example of FIG. 7, and optionally including one or more network switches 703a, 703b, 703c and/or host machines 701a, 701b) has a storage device that is known as the group lead (704a in FIG. 7).

Although a group may include one or more storage devices, it may also include network switches and/or hosts. Therefore, in the examples of FIG. 7, it is understood that each group may include one or more storage devices 704a, 704b, but the group is not so limited, and the group may also include one or more network switches 703a, 703b, 703c, and/or one or more hosts 701a, 701b. In the descriptions herein, groups of two storage devices 704a, 704b are presented for conciseness of description, and it is understood that the group size is not so limited and may include network switches and/or hosts and/or other computing devices. In addition, each of the computing devices may include at least one active control module (CM) and/or passive CM. For non-limiting example in FIG. 7, the storage devices 704a, 704b may include active CMs (710a, 710b, respectively) and/or passive CMs (711a, 711b, respectively).

Prior to validation login, initial configuration is performed. The storage group (collectively 704a and 704b) is configured. The storage devices 704a, 704b and the hosts 701a, 701b and their respective network interface cards (NICs) are configured and interconnected (through cabling, wiring, interfaces, ports, and/or any other interconnect means) to the network switches 703a, 703b, 703c, as illustrated in FIG. 7.

After initial configuration, the validation login procedure may proceed. The validation login procedure may include one or more of the following steps:

1. A SAN IP Validation utility is installed on a host 701b (including, but not limited to, a WINDOWS host).
2. A SAN IP Validation Windows Host 701b accesses an iSCSI well known address (WKA) network (through network switch 703a) or the Storage Groups Network Management network (through management switch 703c).
3. The SAN IP Validation utility logs into a Group IP (Group Lead member) or Network Management Group IP (if in use).
4. Storage device command line interface (CLI) commands are run from a Group Lead member (such as 704b) to all other Members in the Storage Group (such as 704a).
5. Commands and/or results are captured and saved in one or more log files on the SAN IP Validation Host 701b.

After validation login, testing commands may be initiated from the group lead storage device 704a in order to test one or more member computing devices of the connectivity set (including, but not limited to, elements 701a, 701b, 703a, 703b, 703c, 704a, and 704b). For example, testing commands may be initiated from the group lead storage device 704a, in order to test computing devices which are directly connected to it, such as 703a, 703b, and 703c. In addition, testing commands may be initiated from the group lead storage device 704a, in order to test computing devices which are indirectly connected to it, such as 701a, 701b, and 704b.

Note, a key advantage of the present invention is that tests may be initiated and/or run directly from the group lead 704a, as opposed to being initiated and/or run from the host 701b. For non-limiting example, one testing path may start from group lead 704a and then test network switch 703b, and then test storage device 704b. Another testing path may start from group lead 704a and then test network switch 703a, and then test storage device 704b. Yet another testing path may start from group lead 704a, and test management switch 703c, host 701b, network switch 703a, and host 701a. Although, in one embodiment, a testing path starts from the group lead 704a, the present invention is not so limited. The present invention may be configured to test the interconnect in the storage area network, including the interconnect between the member computing devices.

As illustrated in FIG. 7, an interface status test (array status test 502 of FIG. 5) may be performed. The interface status test validates that interfaces on the active controller module (CM) 710a are connected to a switch and one or more links are present. This procedure is repeated until the interfaces are tested for the member computing devices (which may include, but are not limited to, the member computing devices 701a, 701b, 703a, 703b, 703c, 704a, 704b, in the example of FIG. 7).

The interface status test (also known as the interfaces status test) may include one or more of the following steps, in order to test one or more interfaces:
 1. Select Interface Status Test.
 2. Group lead member 704a initiates CLI commands to other members in the Group (including but not limited to storage device 704b) to perform a show interface status on their active CMs (710a, 710b).
 3. Commands and/or results are captured and saved in one or more log files on a host 701b.

As illustrated in FIG. 7, a ping test (ping validation test 503 of FIG. 5) may be performed. The ping test may run an internet control message protocol (ICMP) ping test from interfaces on the group lead 704a to the interfaces on the other member computing devices (including, but not limited to, 704b, and optionally also including 703a, 703b, 703c, 701a, and 701b) within a group. The test will start on the group lead interface (for example, Ethernet eth0 interface) and when interfaces on the other member computing devices are validated successfully (ICMP ping test passed) then the test switches to another group lead interface (for example, Ethernet eth1 interface) reruns the test. This procedure is repeated until the interfaces on the group lead 704a are tested and the group lead 704a tests the interfaces on selected computing devices.

The ping test (also known as the ping validation test or SAN IP validation ping test) may include one or more of the following steps:
 1. Select the ping test.
 2. The group lead member 704a initiates CLI commands to gather interface and/or IP information.
 3. The group lead pings from its Ethernet port (for example, eth0 port) to other ports (for example, eth0 and/or eth1) of the other member computing devices on the active CM 710a.
 4. The group lead then pings from its Eth1 port to other member computing devices (including, but not limited to, 704b, and optionally also including 703a, 703b, 703c, 701a, and 701b) Ethernet ports (such as eth0 and/or eth1 ports).
 5. The commands and/or results are captured and saved in one or more log files on the host 701b.

In another embodiment, the ping test may include an interface to host initiator ping test (also known as the interface to initiator test). The interface to initiator test may run an ICMP ping test from one or more interfaces on the group lead 704a to one or more interfaces on a host 701b with an IP Access Control List (ACL) entry on a test volume (a test volume may include one or more storage devices 704a, 704b). The test may start on the Group Lead eth0 Ethernet interface and when Network Interface Cards (NICs) on the Host 701b are validated (pass an ICMP ping test) then the test may switch to the Group Lead eth1 Ethernet interface and rerun the test. This procedure may be repeated until the interfaces in the group (associated with the member computing devices of the group) are tested.

The interface to host initiator test may include one or more of the following steps:
 1. Select the ping test.
 2. A user is prompted to enter a test volume that is configured with the proper IP ACL for the host 701b to test.
 3. Verification of the test volume configuration is performed.
 4. A group lead member initiates CLI commands to gather interface and/or IP information for member interfaces.
 5. A ping test is run from interfaces on the group to interfaces on the Host.
 6. Commands and/or results are captured and saved in one or more log files on the host.

As illustrated in FIG. 7, a CM failover test (CM failover test 504 of FIG. 5) may be performed. The CM failover may disable the active CM and enable the passive CM by making it active. Then, the previous tests are rerun and validate the now new active CM.

The CM failover test may include one or more of the following steps:
 1. Select the CM failover test.
 2. Prompt the user to verify that the user wants to failover the CMs.
 3. After the user verification, failover each member computing device's CMs one at a time verifying that the previous member computing device is up (performing as expected) before moving to the next member computing device.
 4. Commands and/or results are captured and saved in one or more log files on the host.

In another embodiment, as illustrated in FIG. 8, a network 800 may include a production site (production group), or local group 706, that includes member computing devices such as hosts 701a, 701b, network switches 703a, 703b, 703c and storage devices 704a, 704b, each storage device having one or more CMs, such as an active CM and a passive CM. The network 800 may also include a data replication (DR) site (DR group), or remote group 705, that includes member computing devices such as network switches 703d, 703e, and storage devices 704c, 704d.

As illustrated in FIG. 8, a replication test (replication test 505 of FIG. 5) may be performed. The replication test may run an ICMP ping test from interfaces on the production group 706 to the interfaces on the DR group 705. The replication test may start on the production group lead 704a Ethernet (eth0) interface and when interfaces on the DR group are validated (pass an ICMP ping test) then the test may switch to the next Ethernet (eth1) interface on the group lead 704*a* and rerun the test. This may be repeated for the interfaces on the production group lead 704*a*, until the interfaces on the DR group 705 and its associated member computing devices are tested. For non-limiting example, the group lead 704*a* may test all interfaces associated with network switches 703*d*, 703*e*, and storage devices 704*c*, 704*d*, and other member computing devices.

In another embodiment, the CM failover may be performed, and the replication test may be repeated. In yet another embodiment, the replication test may run an ICMP ping test from interfaces on the DR group to the interfaces on the production group. For non-limiting example, the group lead 704*c* may test interfaces associated with network switches 703*a*, 703*b*, and storage devices 704*a*, 704*b*.

The replication test may include one or more of the following steps:
1. Select the replication test.
2. Log the user into the replication group, if not already logged in.
3. Group lead members 704*a*, 704*c* on the production group 706 and DR group 705, respectively, initiate CLI commands to gather interface and/or IP information.
4. Group lead 704*a* on the production group 706 runs a ping test from its Ethernet (Eth0) port to the DR group 705 interfaces on the active CMs.
5. Group lead 704*a* on the production group 706 runs a ping test from its other Ethernet ports (including, but not limited to, Eth1) to the DR group 705 interfaces on the active CMs.
6. This procedure is repeated until active interfaces on the production group 706 complete ping tests to interfaces on the DR group 705 active interfaces.
7. Commands and/or results are captured and saved in one or more log files on the host 701*b*.

Referring back to FIG. 6, additional embodiments of the user interface 600 may include other features, including, but not limited to, the following steps. Note, the order of the steps to follow is not limited, and in alternative embodiments other steps may be performed:
1) The user may be prompted to enter login information for the group of member computing devices by selecting a menu option.
   a. The user may indicate whether the network is a dedicated management network.
   b. The user interface may prompt the user for the group IP address or the management network address and the group administration (grpadmin) password. The script uses the grpadmin account to access one or more of the storage devices.
   c. The user interface may prompt the user to test to a replication partner group (and/or replication partner array) and/or password.
2) Once logged in, the group logged into may be highlighted in the currently logged into group field. Highlighting and indicators herein may include changes in color of text, text, graphics, video and/or audio presentation. Replication partners may also be highlighted.
3) The user may select the SAN Validation Test.
4) The user may select the Array Interface Status Test. Running the Array Interface Status Test provides a quick status of member interfaces, including, but not limited to, speed and link state. Interfaces that fail are highlighted.
5) After running the Array Interface Status Test and verifying that the ports are configured for the proper speed and link up state, the user may run the ping validation test. The ping validation test in a single member configuration may run a ping test from the storage device to one or more storage devices (a pre-configured volume) logged into a host. In a multi-member group the ping validation test may run a ping test from each interface on the group lead to the other member interfaces.
   i) The ping validation test may run on a single member. The first screen in the ping validation test on a single member may inform the user that it found a single member and that the test may run to a test volume.
6) The user may be prompted to verify that a test volume is configured and that there is an active ACL setup for the volume.
7) If a test volume is setup, the program finds available volumes and lists them for the user.
8) The user may select a preferred volume for the test.
9) The program finds the ACLs associated with the selected volume and runs a ping test from the storage device (array) interfaces back to each ACL that it found. Failed tests are highlighted using an indicator (or color) and are investigated as to why the connection failed.
   i) The ping validation test includes a multiple member information user display screen informing the user to run a ping test from the group lead interfaces out to the member interfaces.
10) The test runs from the group lead out to members. If the management port is configured on the storage devices (storage arrays), then the display informs the user that the storage devices are setup. Errors are indicated using highlighting and are fixed before continuing to the CM failover test.
11) The user may choose to run a ping test from a host to group member interfaces.
12) Available volumes are detected and listed. The user may select a volume to test.
13) The user may confirm whether the correct volume is listed.
14) Once the ping validation test passes, the user may select the CM failover test. The CM failover test may fail the active controllers over to the passive controllers.
15) An informational screen is displayed that explains that the test fails over each members CM.
16) The display indicates the current active CM and fails it over to the passive CM.
17) Because the storage device (array) is running on a new controller (the passive controller is now in use, as opposed to the active controller being in use) the user is prompted to rerun the storage device (array) interface status and the ping validation tests in order to verify that the controllers and interfaces are operating properly.
18) If a replication partner is configured during the initial login, then a user may select replication partner tests.
19) Upon selecting the replication partner test, a ping test is run from each of the local array's interfaces to the interfaces on the remote replication partner.
20) The user may view the log file that is created by selecting a menu option.
21) Once the tests are complete, the user may select the group configuration script. This script provides the user with a point in time snapshot of the current configuration of the group. If MICROSOFT EXCEL is installed on the host that the user is running the program from, then the program outputs the results into a MICROSOFT EXCEL spreadsheet. Alternatively, if MICROSOFT EXCEL is not installed, then the program provides the user with a text output file.

22) The program asks the user for user information. This information is included in the generated MICROSOFT EXCEL file and/or text file.

23) When the program completes, it provides the name and location of an output file.

An advantage of the present invention is that it simplifies the complex process of validating the customer's SAN environment. By validating an environment before putting the customer system in production, efficiency is achieved. Detecting issues in a customer's environment prior to, or at, the time of deployment, helps to reduce the occurrence of commonly encountered issues, and may reduce the number of phone calls received into technical support.

Another advantage of the present invention is that tests may be initiated and/or run directly from a group lead storage device, as opposed to being initiated and/or run from a host computing device.

It should be understood that the example embodiments described above may be implemented in many different ways. In some instances, the various methods and machines described herein may be implemented by a physical, virtual or hybrid general-purpose computer, or a computer network environment such as the computer network environment 440. A general purpose computer may be transformed into the machines that execute the methods described above, for example, by loading software instructions into memory or nonvolatile storage for execution by a central processing unit.

Embodiments or aspects thereof may be implemented in the form of hardware, firmware, or software or any combination thereof. If implemented in software, the software may be stored on any non-transient computer readable medium that is configured to enable a processor to load the software or subsets of instructions thereof. The processor then executes the instructions and is configured to operate or cause an apparatus to operate in a manner as described herein.

Further, firmware, software, routines, or instructions may be described herein as performing certain actions and/or functions of data processors. However, it should be appreciated that such descriptions contained herein are merely for convenience and that such actions in fact result from computing devices, processors, controllers, or other devices executing the firmware, software, routines, instructions, etc.

It also should be understood that the flow diagrams, block diagrams, and network diagrams may include more or fewer elements, be arranged differently, or be represented differently. But it further should be understood that certain implementations may dictate the block and network diagrams and the number of block and network diagrams illustrating the execution of the embodiments be implemented in a particular way.

Accordingly, further embodiments may also be implemented in a variety of computer architectures, physical, virtual, cloud computers, and/or some combination thereof, and, thus, the data processors described herein are intended for purposes of illustration only and not as a limitation of the embodiments.

While this invention has been particularly shown and described with references to example embodiments thereof, it will be understood by those skilled in the art that various changes in form and details may be made therein without departing from the scope of the invention encompassed by the appended claims.

What is claimed is:

1. A computer-implemented method for verifying connectivity in a storage area network, the computer-implemented method comprising:

communicating, through one or more network switches, with at least one of two or more storage devices of a storage area network (SAN) connected to the one or more network switches, from at least one of one or more host machines connected to the one or more network switches, the one or more host machines being external to the SAN;

based on the communication, automatically initiating and executing a connectivity test procedure at one or more active modules of the two or more storage devices of the SAN and automatically switching from the one or more active modules to at least one passive module of the two or more storage devices, the automatically switching including automatically initiating and executing the connectivity test procedure at the at least one passive module;

determining, through the connectivity test procedure, each state of connectivity from the at least one of the two or more storage devices of the SAN to each member computing device of a connectivity set that includes at least one of the following: at least one other storage device of the SAN, at least one of the one or more network switches, and at least one of the one or more host machines; and providing a report to one or more users, the report including each state of connectivity.

2. The computer-implemented method of claim 1 wherein the connectivity includes at least one of: interconnect, cabling, wiring, interfaces, and ports.

3. The computer-implemented method of claim 1, further comprising automatically initiating and executing the connectivity test procedure at the at least one of the two or more storage devices, further comprising automatically determining each state of connectivity from the one or more storage devices to each member computing device, and further comprising automatically providing the report.

4. The computer-implemented method of claim 1 wherein the report is provided to the at least one of the one or more host machines, and the report includes one or more log files.

5. The computer-implemented method of claim 1 wherein each state of connectivity is determined, through the connectivity test procedure, by the at least one of the two or more storage devices sending one or more commands to each member computing device of the connectivity set and receiving one or more status messages from each member computing device of the connectivity set.

6. The computer-implemented method of claim 1 wherein the connectivity test procedure includes one or more ping tests from the at least one of the two or more storage devices to each member computing device of the connectivity set.

7. The computer-implemented method of claim 1 wherein the at least one of the two or more storage devices is indirectly connected to at least one member computing device of the connectivity set.

8. The computer-implemented method of claim 1 wherein the connectivity set includes one or more redundant or replicated member computing devices.

9. The computer-implemented method of claim 1 wherein the storage area network includes an Internet Small Computer System Interface (iSCSI) storage area network.

10. An information handling system (IHS) comprising:
a data module configured to communicate, through one or more network switches, with at least one of two or more storage devices of a storage area network (SAN) connected to the one or more network switches, from at least one of one or more host machines connected to the one or more network switches, the one or more host machines being external to the SAN;
a computing module, configured to automatically initiate and execute, based on the communication, a connectivity test procedure at one or more active modules of the two or more storage devices of the SAN, and perform an automatic switch from the one or more one active modules to at least one passive module of the two or more storage devices, the automatic switch including automatically initiating and executing the connectivity test procedure at the at least one passive module;
the computing module further configured to determine, through the connectivity test procedure, each state of connectivity from the at least one of the two or more storage devices of the SAN to each member computing device of a connectivity set that includes at least one of the following: at least one other storage device of the SAN, at least one of the one or more network switches, and at least one of the one or more host machines; and
a reporting module configured to provide a report to one or more users, the report including each state of connectivity.

11. The IHS of claim 10 wherein the connectivity includes at least one of:
interconnect, cabling, wiring, interfaces, and ports.

12. The IHS of claim 10 wherein the computing module is further configured to automatically initiate and execute the connectivity test procedure at the at least one of the two or more storage devices, and the computing module is further configured to automatically determine each state of connectivity from the one or more storage devices to each member computing device, and the reporting module is further configured to automatically provide the report.

13. The IHS of claim 10 wherein the reporting module is further configured to provide the report to the at least one of the one or more host machines, and the report includes one or more log files.

14. The IHS of claim 10 wherein the computing module is further configured to determine, through the connectivity test procedure, each state of connectivity, by the at least one of the two or more storage devices sending one or more commands to each member computing device of the connectivity set and receiving one or more status messages from each member computing device of the connectivity set.

15. The IHS of claim 10 wherein the connectivity test procedure includes one or more ping tests from the at least one of the two or more storage devices to each member computing device of the connectivity set.

16. The IHS of claim 10 wherein the at least one of the two or more storage devices is indirectly connected to at least one member computing device of the connectivity set, and the connectivity set includes one or more redundant or replicated member computing devices.

17. A non-transitory computer readable medium having stored thereon a sequence of instructions which, when loaded and executed by a processor coupled to an apparatus, causes the apparatus to:
communicate, through one or more network switches, with at least one of two or more storage devices of a storage area network (SAN) connected to the one or more network switches, from at least one of one or more host machines connected to the one or more network switches, the one or more host machines being external to the SAN;
based on the communication, automatically initiate and execute, at one or more active modules of the two or more storage devices of the SAN, a connectivity test procedure and perform an automatic switch from the one or more one active modules to at least one passive module of the two or more storage devices, the automatic switch including automatically initiating and executing the connectivity test procedure at the at least one passive module;
determine, through the connectivity test procedure, each state of connectivity from the at least one of the two or more storage devices of the SAN to each member computing device of a connectivity set that includes at least one of the following: at least one other storage device of the SAN, at least one of the one or more network switches, and at least one of the one or more host machines; and
provide a report to one or more users, the report including each state of connectivity.

18. The computer-implemented method of claim 1 further comprising, within the storage area network, communicating with the at least one of the two or more storage devices, from the at least one of the one or more host machines, and based on the communication, further initiating and executing the connectivity test procedure.

19. The computer-implemented method of claim 1 wherein the connectivity test procedure includes:
one or more interface tests of at least one interface associated with the at least one of the two or more storage devices;
one or more ping tests from the at least one of the two or more storage devices to each member computing device of the connectivity set;
one or more switching tests associated with the switching from the one or more active modules to the at least one passive module; and
one or more connectivity tests, wherein the connectivity set includes one or more redundant or replicated member computing devices.

20. The computer-implemented method of claim 1 wherein the connectivity test procedure includes the ordered steps of:
one or more interface tests of at least one interface associated with the at least one of the two or more storage devices;
followed by one or more ping tests from the at least one of the two or more storage devices to each member computing device of the connectivity set;
followed by one or more switching tests associated with the switching from the one or more active modules to the at least one passive module; and followed by one or more connectivity tests, wherein the connectivity set includes one or more redundant or replicated member computing devices.

* * * * *